Oct. 14, 1952     E. P. SAUNDERS     2,613,565
STUD DRIVER AND PULLER
Filed Feb. 3, 1949
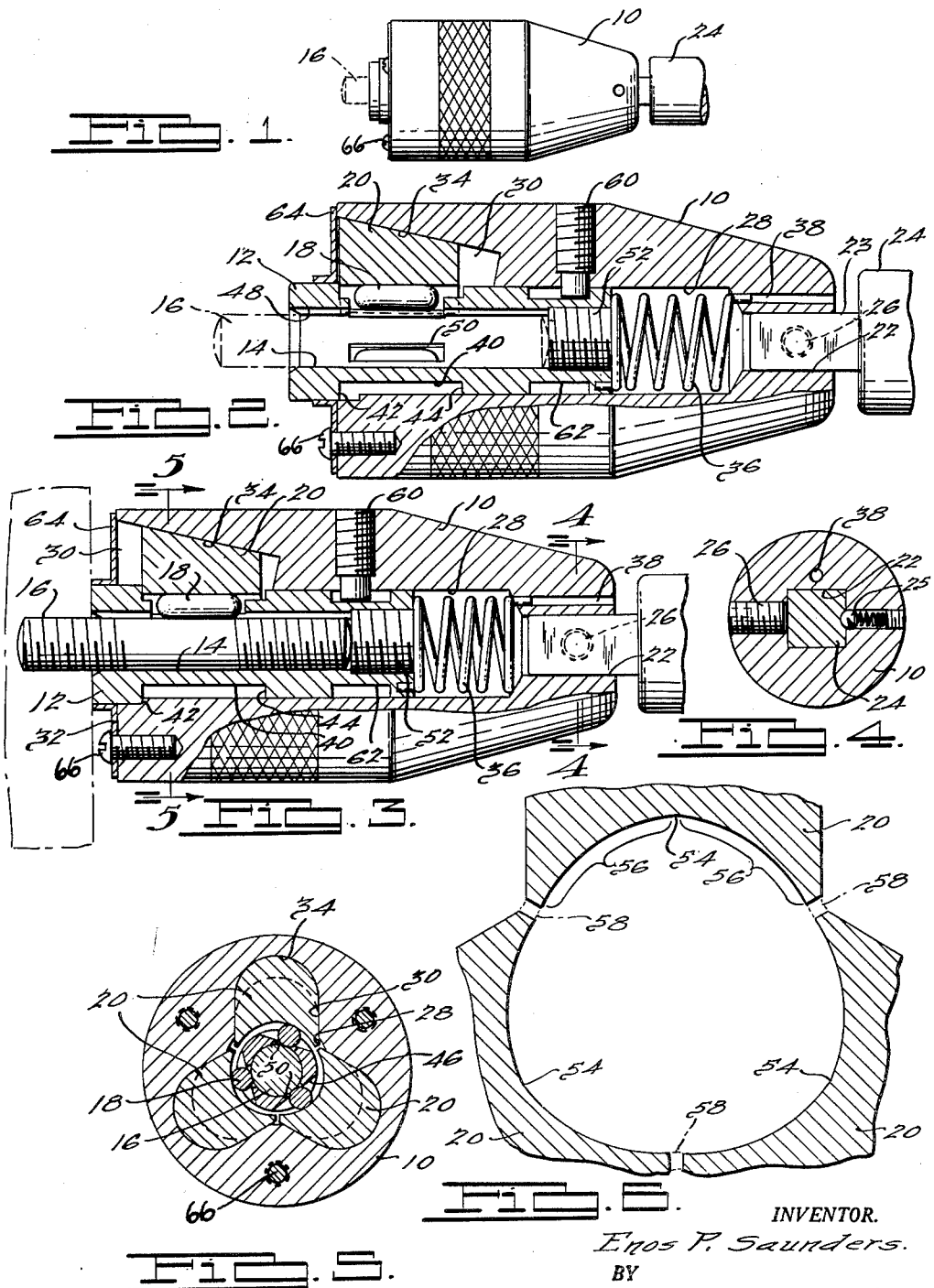
INVENTOR.
*Enos P. Saunders.*
BY
*Harness, Dickey & Pierce.*
ATTORNEYS Patented Oct. 14, 1952

2,613,565

UNITED STATES PATENT OFFICE 2,613,565

STUD DRIVER AND PULLER

Enos P. Saunders, Berkley, Mich.

Application February 3, 1949, Serial No. 74,412

7 Claims. (Cl. 81—53)

This invention relates to chucks and more particularly to chucks adapted to perform rotary driving and withdrawing operations such, for example, as the driving and withdrawing of studs.

The present invention contemplates the provision of an improved reversible chuck for driving or withdrawing studs or the like, which is simple in construction, economical of manufacture, and reliable and efficient in operation.

It is an object of the present invention to provide an improved chuck having a minimum of parts and so constructed that it may be relatively simple and inexpensively but accurately manufactured.

A further object of the present invention is to provide an improved chuck including means which may be pressed axially of the chuck to effect initial engagement of the stud by the gripping elements and in which the gripping elements comprise cylindrical rollers.

Another object of the invention is to provide an improved chuck readily adaptable for withdrawing studs of various lengths and in which studs to be withdrawn may be gripped close to the surface of the object into which they are threaded.

Other and more detailed objects of the invention will be readily apparent from a consideration of the following specification, the appended claims, and the accompanying drawing, throughout the several views of which like reference characters designate like parts, and wherein:

Figure 1 is a view in elevation of a chuck embodying the present invention and illustrating a broken portion of a conventional associated tool for rotating the chuck, and showing in broken lines a stud received in the chuck;

Fig. 2 is an enlarged longitudinal sectional view of the construction illustrated in Fig. 1 illustrating the relative position of the parts prior to the gripping of the stud by the chuck;

Fig. 3 is a longitudinal sectional view similar to Fig. 2 illustrating the relative position of the parts of the chuck during the driving of the stud;

Figs. 4 and 5 are transverse sectional views of the construction illustrated in Fig. 3 taken along the lines 4—4 and 5—5 thereof, respectively; and, Fig. 6 is a greatly enlarged broken sectional view of the cam elements employed in the present chuck showing the shape of the cam surfaces formed on the inner faces of the cam elements.

It will be appreciated from a complete understanding of the present invention that, in a generic sense, the improvements thereof may be embodied in chucks or work-holding devices of widely differing types and sizes. In an illustrative but not in a limiting sense, the present improvements are herein illustrated and described as embodied in a stud driver and puller.

Referring to the drawing, the chuck generally comprises a housing or operating member 10, a cage 12 mounted in the housing 10 for rotary and axial movement relative thereto, and having a central bore 14 adapted to receive a stud 16 to be driven or withdrawn by the chuck, a plurality of jaw or gripping elements 18 carried by the cage 12 and adapted to project into the bore 14 to grip the stud 16, and a plurality of cam elements 20 mounted in the housing member 10 for movement axially and radially thereof and adapted to cam the gripping elements 18 into the bore 14 to grip the stud 16.

Considering the above mentioned elements in greater detail, the housing or operating member 10 is formed to provide a central cavity or passage extending axially therethrough and including a portion 22 of square cross section adjacent one end of the member 10 adapted to receive the conventional square adapter 23 of an associated tool 24 for rotating the operating member 10. The operating member 10 carries the usual spring pressed ball 25 adapted to be received in a cooperating recess in one face of the adapter element 23, and set screw 26 adapted to be set against the opposite face of the adapter element 23. Extending from the square portion 22 of the central passage, to the opposite end of the operating member 10, is a central bore 28 somewhat larger in diameter than the square portion 22. Adjacent the open end of the bore 28, the end thereof remote from the square passage portion 22, the operating member 10 is formed to provide three equally angularly spaced radially outwardly extending recesses 30 communicating with the bore 28 and opening to the adjacent end 32 of the operating member 10. The radially outer wall 34 of the recess 30 is inclined relative to the axis of the operating member 10, as best illustrated in Figs. 2 and 3, and, in the preferred embodiment illustrated in the drawing, is cylindrical in shape as best illustrated in Fig. 5. The cam elements 20 have their outer surfaces shaped to fit and slide along the recesses 30, it being appreciated that as the cam elements 20 are moved axially inwardly of the operating member 10 the outer wall portions 34 of the recesses 30 cam the elements 20 radially inwardly of the operating member 10.

The cage 12 is generally cylindrical in shape and is mounted in the bore 28 for rotary and axial movement relative to the operating member 10. The cage 12 is urged axially outwardly of the bore 28 and yieldably held against rotary movement relative to the operating member 10 by a coil spring 36 disposed in the bore 28 between the inner end of the cage 12 and the inner end of the bore 28. One end of the spring 36 extends axially into a passage 38 communicating with the bore 28 outwardly of the square passage portion 22, to anchor one end of the spring relative to the operating member 10, and the other end of the spring 36 is anchored in the adjacent end of the cage 12. In spaced relation to its outer end, the cage 12 has an annular portion 40 of reduced diameter defining an annular groove adapted to receive the radially inner portion of the cam elements 20. The end portion of the cage 12 axially outwardly of the annular groove 40 is of slightly increased diameter thereby providing an axially inwardly presenting annular shoulder 42 at the outer limit of the groove 40 adapted to engage the axially outer faces of the cam elements 20 when the latter are in their axially and radially outer positions illustrated in Fig. 2, whereby the cam elements 20 will be moved axially inwardly by the cage 12 upon movement of the latter axially inwardly of the operating member 10. At the axially inner end of the groove 40 is an annular shoulder 44 having a slightly smaller radial extent than the above described shoulder 42. This annular shoulder 44 is adapted to engage the axially inner faces of the cam elements 20 upon movement of the cage 12 outwardly from the position illustrated in Fig. 3, to move the cam elements 20 axially outwardly toward the position illustrated in Fig. 2. It will be appreciated that upon such movement of the cam elements 20 axially outwardly they may also move radially outwardly in the recesses 30 thereby permitting the shoulder 44 to pass between the cam elements 20 permitting assembly and disassembly of the chuck.

Within the annular groove 40, three equally angularly spaced, axially extending flats 46 are formed on the external surface of the cage 12. An axially extending slot 50 opening radially through the cage 12 is formed centrally of each of the flats 46 by broaching three grooves 48 in the wall of the central bore 14 of the cage 12. These grooves 48 extend throughout the axial length of the cage 12 and to a depth slightly greater than the thickness of the cage 12 adjacent the midpoints of the flats 46. At the axially inner end of the bore 14 a threaded plug 52 is removably mounted in the cage 12 and closes the bore 14 to provide an abutment adapted to be engaged by the inner end of the stud 16 whereby the application of pressure to the outer end of the stud 16 axially thereof will urge the cage 12 axially inwardly, thereby moving the cam elements 20 axially and radially inwardly as above described.

The gripping elements 18 are cylindrical rollers disposed in the slots 50 and having an axial extent less than that of the slots 50 and a diameter such that they may project through the slots 50 into the bore 14, but sufficiently large to prevent the rollers 18 from passing bodily through the slots 50 into the bore 14.

The cam elements 20 have noncircular, cylindrical, radially inner surfaces extending parallel to the axis of the bore 14 and adapted to engage the rollers 18. These radially inner surfaces of the cam elements 20 are shaped to include a central low point indicated at 54 and cam surfaces 56 disposed at opposite sides thereof adapted upon rotation of the operating member 10, in which the cam elements 20 are carried, relative to the cage 12, to cam the rollers 18 radially inwardly of the cage 12 to securely grip the stud 16. The cam surfaces 56 are similarly formed at opposite sides of the low points 54 so that the chuck may be employed equally effectively for driving studs having left hand or right hand threads. Also, the spring 36 is so connected to the cage 12 that it at all times yieldably urges the cage 12 and the operating member 10 toward the relative position in which the low points 54 of the cam element 20 are aligned with the slots 50 in the cage 12. To simplify and provide for greater accuracy in the manufacture of the cam elements 20, in the preferred embodiment illustrated these three cam elements are machined in a single case and then are separated by cutting away the portions indicated in broken lines at 58.

Positive limits for the relative movement of the cage 12 axially of the operating member 10 are provided by the engagement of a set screw 60 mounted in the operating member 10 and having an inner end portion received in an annular groove 62 formed in the outer surface of the cage 12 intermediate the annular groove 40 and the inner end of the cage 12.

To prevent dirt and other foreign material from entering the outer ends of the recesses 30 a cover plate 64 is secured to the outer end 32 of the operating member 10 by screws 66.

From the foregoing description it will be appreciated that in operation a stud 16 is inserted into the bore 14 of the cage 12 while the parts are held in the position illustrated in Fig. 2 by the action of the spring 36. When the outer end of the stud 16 is placed against an object into which it is to be driven and pressure is applied, the stud, pushing against the plug 52, forces the cage 12 axially inwardly against the pressure of the spring 36 until the cam elements 20 are moved axially and radially inwardly sufficiently to force the rollers 18 inwardly against the stud 16. A force is then applied through the tool 24 to rotate the operating member 10. This will result in some initial relative rotation between the operating member 10 and the stud 16, which rotation is accompanied by the rollers 18 rolling around the stud 16 and simultaneously rolling from the low points 54 up along the cams 56 thereby camming the rollers 18 radially inwardly until the stud 16 is firmly gripped and relative rotation between the operating member 10 and stud 16 stops. Upon completing the driving of the stud 16 a slight pull on the operating member 10 will cause the cam elements 20 to slide axially and radially outwardly in the recesses 30, to release the stud 16 and will permit the action of the spring 36 to return the rollers 18 to the low points 54 on the inner surfaces of the cam elements 20 and force the cage 12 and the cam elements 20 axially outwardly.

When it is desired to use the chuck of the present invention for pulling or withdrawing studs, the plug element 52 may be removed permitting the chuck to be passed over the stud to a position in which the outer end of the cage 12 abuts the structure into which the stud is threaded, independently of the length of the stud, thereby permitting the stud to be gripped close to the point at which it projects from the structure in which it is mounted. It will now be appreciated that the chuck may be pressed against the structure in which the stud is mounted, thereby forcing the cage 12 axially inwardly to effect the gripping of the stud. From this point on the pulling of the stud is the same as the driving of the stud, except, of course, that the rotation is in the opposite direction.

Although only one embodiment of the invention has been illustrated and described in detail, it will be readily appreciated by those skilled in the art that various modifications and changes may be made without departing from the spirit of the present invention.

What is claimed is:

1. A chuck comprising an operating member having a central cavity extending axially thereof, said member being shaped to define a plurality of radially outwardly extending cavity portions the outer wall portions of which define cam surfaces inclined relative to the axis of said member, a cage mounted in said cavity for rotary and axial movement relative to said member and having a central bore and a plurality of apertures opening radially therethrough, a plurality of jaw elements mounted in said apertures and adapted to project into but not pass into said bore, a plurality of cam elements individual to and mounted in said cavity portions and having outer surfaces adapted to slide along said cam surfaces, said cam surfaces being adapted to co-operate with said cam elements upon movement of said elements axially inwardly of said member to cam said elements radially inwardly, the inner surfaces of said cam elements being adapted to engage said jaw elements and having second cam surfaces adapted, upon rotation of said operating member relative to said cage, to cam said jaw elements inwardly.

2. A chuck comprising an operating member having a central cavity extending axially thereof, said member being shaped to define a plurality of radially outwardly extending cavity portions the outer wall portions of which define cam surfaces inclined relative to the axis of said member, a cage mounted in said cavity for rotary and axial movement relative to said member and having a central bore and a plurality of apertures opening radially therethrough, a plurality of jaw elements mounted in said apertures and adapted to project into but not pass into said bore, a plurality of cam elements individual to and mounted in said cavity portions and having outer surfaces adapted to slide along said cam surfaces, said cam surfaces being adapted to cooperate with said elements upon movement of said elements axially inwardly of said member to cam said elements radially inwardly, the inner surfaces of said cam elements being adapted to engage said jaw elements and having second cam surfaces adapted, upon rotation of said operating member relative to said cage, to cam said jaw elements inwardly, said cam elements engaging said cage for movement with said cage axially of said operating member, and a spring mounted in said cavity and acting against said cage to urge it axially outwardly of said operating member.

3. A chuck comprising an operating member having a central cavity extending axially thereof, said member being shaped to define a plurality of radially outwardly extending cavity portions the outer wall portions of which define cam surfaces inclined relative to the axis of said member, a cage mounted in said cavity for rotary and axial movement relative to said member and having a central bore and a plurality of apertures opening radially therethrough, a plurality of jaw elements mounted in said apertures and adapted to project into but not pass into said bore, a plurality of cam elements individual to and mounted in said cavity portions and having outer surfaces adapted to slide along said cam surfaces, said cam surfaces being adapted to cooperate with said elements upon movement of said elements axially inwardly of said member to cam said elements radially inwardly, the inner surfaces of said cam elements being adapted to engage said jaw elements and having second cam surfaces adapted, upon rotation of said operating member relative to said cage, to cam said jaw elements inwardly, said cam elements engaging said cage for movement with said cage axially of said operating member, a spring mounted in said cavity and acting against said cage to urge it axially outwardly of said operating member, and cooperating means on said member and said cage limiting relative axial movement therebetween.

4. A chuck comprising an operating member having a central cavity extending axially thereof, said member being shaped to define a plurality of radially outwardly extending cavity portions the outer wall portions of which define cam surfaces inclined relative to the axis of said member, a cage mounted in said cavity for rotary and axial movement relative to said member and having a central bore and a plurality of apertures opening radially therethrough, a plurality of jaw elements mounted in said apertures and adapted to project into but not pass into said bore, a plurality of cam elements individual to and mounted in said cavity portions and having outer surfaces adapted to slide along said cam surfaces, said cam surfaces being adapted to cooperate with said elements upon movement of said elements axially inwardly of said member to cam said elements radially inwardly, the inner surfaces of said cam elements being adapted to engage said jaw elements and having a central low point and second cam surfaces on opposite sides thereof so that upon rotation of said operating member in either direction, when said jaw elements are at said low point, one of said second cam surfaces will cam said jaw elements inwardly, said cam elements engaging said cage for movement with said cage axially of said operating member, and a spring mounted in said cavity and acting against said cage to urge it axially outwardly of said operating member, the opposite ends of said spring being anchored respectively in said operating member and said cage and yieldably holding said cage so disposed relative to said operating member that said apertures are aligned with said low points of said cam elements.

5. A chuck comprising an operating member having a central cavity extending axially thereof, said member being shaped to define a plurality of radially outwardly extending cavity portions the outer wall portions of which define cam surfaces inclined relative to the axis of said member, a cage mounted in said cavity for rotary and axial movement relative to said member and having a central bore and a plurality of apertures opening radially therethrough, a plurality of jaw elements mounted in said apertures and adapted to project into but not pass into said bore, a plurality of cam elements individual to and mounted in said cavity portions and having outer surfaces adapted to slide along said cam surfaces, said cam surfaces being adapted to cooperate with said elements upon movement of said elements axially inwardly of said member to cam said elements radially inwardly, the inner surfaces of said cam elements being adapted to engage said jaw elements and having second cam surfaces adapted, upon rotation of said operating member relative to said cage, to cam said jaw elements inwardly, said cam elements engaging said cage for movement with said cage axially of said operating member, a spring mounted in said cavity and acting against said cage to urge it axially outwardly of said operating member, and means carried by said cage adapted to be engaged by a stud received in said chuck and effective upon continued movement of said stud inwardly of said chuck to move said cage and said cam elements axially inwardly of said operating member whereby said cam elements are moved radially inwardly to cause said jaw elements to grip said stud.

6. A chuck comprising an operating member having a central cavity extending axially thereof, said member being shaped to define a plurality of radially outwardly extending cavity portions the outer wall portions of which define cam surfaces inclined relative to the axis of said member, a cage mounted in said cavity for rotary and axial movement relative to said member and having a central bore and a plurality of apertures opening radially therethrough, a plurality of jaw elements mounted in said apertures and adapted to project into but not pass into said bore, a plurality of cam elements individual to and mounted in said cavity portions and having outer surfaces adapted to slide along said cam surfaces, said cam surfaces being adapted to cooperate with said elements upon movement of said elements axially inwardly of said member to cam said elements radially inwardly, the inner surfaces of said cam elements being adapted to engage said jaw elements and having second cam surfaces adapted, upon rotation of said operating member relative to said cage, to cam said jaw elements inwardly, said cam elements engaging said cage for movement with said cage axially of said operating member, a spring mounted in said cavity and acting against said cage to urge it axially outwardly of said operating member, and means carried by said cage adapted to be engaged by a stud received in said chuck and effective upon continued movement of said stud inwardly of said chuck to move said cage and said cam elements axially inwardly of said operating member whereby said cam elements are moved radially inwardly to cause said jaw elements to grip said stud, said last named means comprising a plug removably mounted in the bore of said cage.

7. A stud driver and puller comprising an operating member having a central passage extending axially therethrough and adapted adjacent one end of said member for driving engagement with a conventional driving element, said central passage having an intermediate bore portion and a portion adjacent the opposite end of said member including a plurality of angularly spaced radially outwardly extending cavity portions the outer wall portions of which define cam surfaces inclined relative to the axis of said operating member and opening to said opposite end, a cage mounted in said passage for movement axially of said member and having a central bore and a plurality of angularly spaced axially extending slots opening radially therethrough, a plurality of cylindrical rollers mounted in said slots and adapted to project into but not pass into said bore, a plurality of cam elements individual to and mounted in said cavity portions and having outer surfaces adapted to slide along said cam surfaces, said cam surfaces converging inwardly toward the axis of said member from said opposite end thereof and said cam elements being operatively connected to said cage for movement therewith axially of said member whereby movement of said cage axially inwardly of said member is simultaneously accompanied by movement of said cam elements radially inwardly of said member, the inner surfaces of said cam elements being adapted to engage said rollers and having central low points and second cam surfaces at opposite sides of said low points adapted to cam said rollers inwardly upon rotation of said operating member in either direction relative to said cage, a spring mounted in said bore portion urging said cage axially outwardly of said member and having its opposite ends fixed in said member and said cage respectively to yieldably hold said cage so disposed relative to said member that slots are aligned with said low point of said cam elements, cooperating means on said cage and said member limiting the relative axial movement therebetween, and a plug removably mounted in the bore of said cage.

ENOS P. SAUNDERS.

REFERENCES CITED

The following references are of record in the file of this patent:

UNITED STATES PATENTS

| Number | Name | Date |
|---|---|---|
| 1,898,726 | Hess | Feb. 21, 1933 |
| 2,069,527 | Kirkland | Feb. 2, 1937 |
| 2,105,788 | Hess | Jan. 18, 1938 |
| 2,220,654 | Kirkland | Nov. 5, 1940 |
| 2,251,491 | Lozen | Aug. 5, 1941 |
| 2,305,637 | Ricciardi | Dec. 22, 1942 |

FOREIGN PATENTS

| Number | Country | Date |
|---|---|---|
| 35,848 | Sweden | Nov. 26, 1913 |
| 572,552 | Great Britain | Oct. 12, 1945 |